TELEPHONE TRAFFIC DATA RECORDER

Filed March 29, 1968 7 Sheets-Sheet 1

INVENTORS W. B. CALLAWAY
A. A. DELTUVIA, JR.
BY D. E. Snedeker
ATTORNEY

Dec. 8, 1970 W. B. CALLAWAY ET AL 3,546,678

TELEPHONE TRAFFIC DATA RECORDER

Filed March 29, 1968 7 Sheets-Sheet 2

TELEPHONE TRAFFIC DATA RECORDER

TELEPHONE TRAFFIC DATA RECORDER

Filed March 29, 1968 7 Sheets-Sheet 5

TELEPHONE TRAFFIC DATA RECORDER

Filed March 29, 1968 7 Sheets-Sheet 7

3,546,678

TELEPHONE TRAFFIC DATA RECORDER

William B. Callaway and Andrew A. Deltuvia, Jr., Lincroft, N.J., assignors to Bell Telephone Laboratories, Incorporated, Murray Hill and Berkeley Heights, N.J., a corporation of New York Filed Mar. 29, 1968, Ser. No. 717,173
Int. Cl. G06f 9/18
U.S. Cl. 340—172.5 10 Claims

ABSTRACT OF THE DISCLOSURE

A portable electronic traffic data recorder employs a flying head input scanner rotating in synchronism with a magnetic storage medium for accumulating both peg count and usage data in a form suitable for processing by electronic data processing equipment. Peg counts are obtained by comparing current scan with previous scan. The accumulated data is automatically processed, via memory table look-up, into output coded form concurrently with the accumulation of new data. Input grouping is completely flexible, via selective group marks, and is not recorder-oriented.

BACKGROUND OF THE INVENTION

This invention relates to equipment monitoring and data recording apparatus and, more particularly, to high speed electronic traffic measurement apparatus.

Analysis of the various factors and conditions affecting business operation requires the accumulation of large quantities of statistical data. In the telephone industry, for example, studies are conducted regularly and periodically to accumulate data with regard to telephone equipment utilization. Interpretation of the accumulated data facilitates the proper assignment and disposition of the various telephone lines and equipment, determines the quantities of equipment necessary to handle given volumes of telephone traffic, and provides for further planning with regard to probable telephone equipment requirements. Thus, sufficiency of present units of equipment may be determined, units may be reallocated to areas of greater need, additional units may be allotted, and the number of circuits between central offices may be altered, or other appropriate action taken, to provide optimum service consistent with overall economy of operation.

The data obtained in these traffic studies may take various forms, but it is principally of two types. One of these types of data relates to traffic volumes, or "peg counts," and provides information on how many calls were made or how often the particular unit of equipment was used in a given period of time. This type of traffic data may be obtained by connecting monitoring equipment to the various units of telephone equipment to be observed and registering an indication upon the seizure or release of the unit of equipment. No regard is given to the length of time the equipment is seized or used but only to the total number of seizures. Peg count data is necessarily obtained, therefore, on a random basis.

The other type of data obtained from traffic studies relates to traffic density, or percentage usage of the various units of equipment. This usage data may be obtained, for example, by repeatedly scanning the various units of equipment at regular intervals and registering indications of whether the individual units of equipment are seized or in use at the time of the scan. By assuming that a seizure or busy condition which is present at the time of the scan exists for the interval between successive scans, then each indication registered is indicative of a precise period of usage of the individual unit of equipment being observed. Proper selection of the scanning interval provides the usage data in standard units of traffic measurement. For example, a scanning rate of thirty-six scans per hour produces usage indications in terms of hundred-call-seconds (CCS).

Before the accumulated statistical data can be of practical use, heretofore considerable time and energy have been required in compiling, interpreting and summarizing such data. The time and effort required in processing the data to place it in a more readily usable form necessarily limits the quantity of data that can be accumulated and processed economically. Further, manual and clerical manipulations of the data have been a major source of error therein. Therefore, it is desirable to accumulate the data in a form suitable for processing automatically by centralized traffic data processing equipment, such as disclosed in F. M. Goetz et al. Pat. 3,231,866, issued Jan. 25, 1966, or by other electronic data processing equipment.

SUMMARY OF THE INVENTION

It is, therefore, a general object of this invention to provide an improved traffic recording apparatus for accumulating traffic data in a form suitable for automatic processing thereof.

More particularly, it is an object of this invention to provide a simple, compact and economical electronic traffic data recording arrangement for accumulating both peg count and usage data in encoded form for processing by electronic data processing equipment without the intervention of manual or clerical manipulations.

In accordance with an illustrative embodiment of the invention, the above and other objects are attained in an arrangement having a scanner which is utilized for cyclic monitoring of equipment units to obtain peg count data and which scanner is also used periodically to obtain usage data with regard to the same or other equipment units. A temporary input memory is associated with the scanner for obtaining the peg count data by comparing the results of the current scan with the results of the "last look" or previous scan. Periodically, between two successive peg count scans the scanner performs a usage data scan of particular equipment units. The peg count and usage data are accumulated in respective storage registers associated with the various equipment units or groups of equipment units. The storage registers containing the accumulated traffic data are interrogated subsequently to process the data therein into encoded form for output concurrently with the accumulation of new traffic data. The encoded traffic data is in a form suitable for the production of hard copy via teletypewriter apparatus or the like, and is in a form suitable for automatic processing by electronic data processing equipment.

According to one aspect of the invention, the scanner cycles in synchronism with a rotating magnetic storage medium having a plurality of data storage registers for accumulating the peg count and traffic usage data. The storage medium also includes temporary input storage registers associated with individual ones of the equipment units for storing the status of the individual equipment units from one peg count scan to the next, thereby providing the "last look" scan storage used in obtaining peg count data. Other areas of the storage medium are utilized for translation of the accumulated data into output coded form, via a memory table look-up procedure, concurrently with the registration and accumulation of new data.

A problem often encountered with prior traffic recording apparatus is that they permit input grouping of the monitored equipment units only in fixed group sizes or in multiples of a certain group size. A further and important aspect of the present invention relates to the elimination of this problem by providing substantially unlimited input grouping flexibility, input grouping being variable from one equpment unit up to a group size equal to the total input capacity of the scanner.

BRIEF DESCRIPTION OF THE DRAWING

The above and other objects and features of the invention may be fully apprehended from the following detailed description and the accompanying drawing in which.

GENERAL DESCRIPTION OF THE INVENTION

Figure 1:
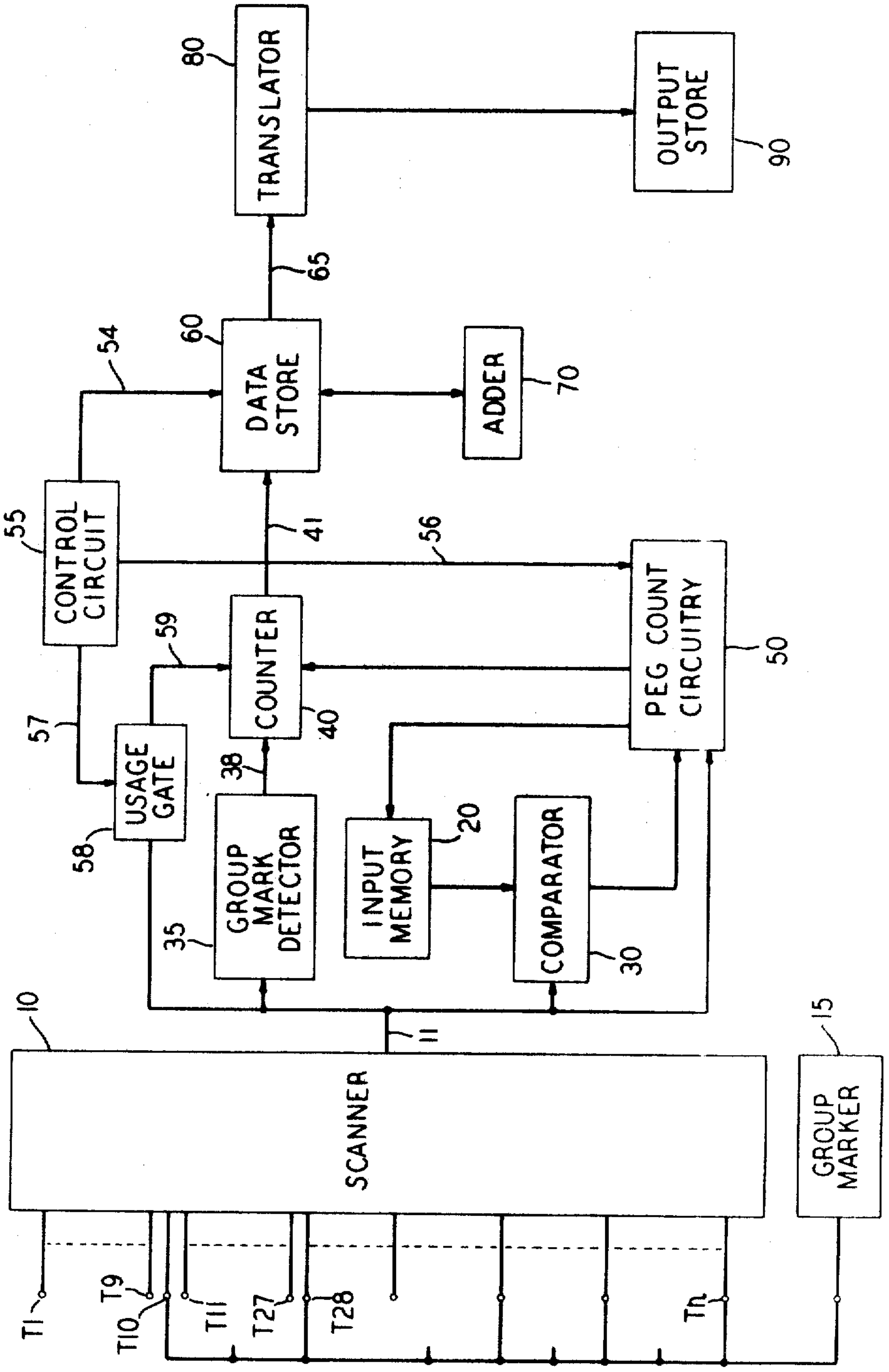
FIG. 1 is a block diagram of an illustrative embodiment of traffic data measurement apparatus in accordance with the principles of our invention.
Figure 2:
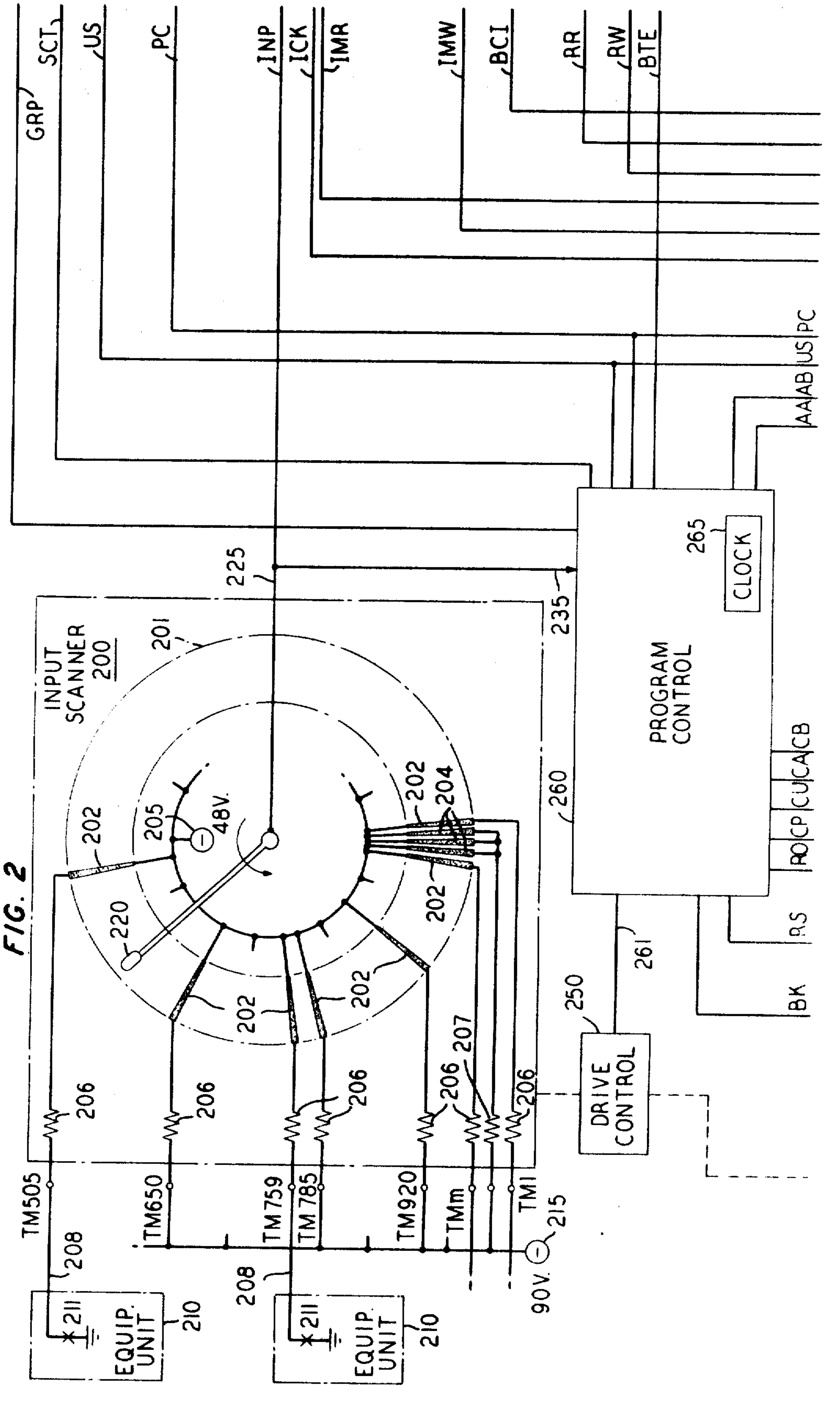
FIGS. 2 through 5, when arranged as indicated in FIG. 6, comprise an additional block diagram showing portions of the embodiment of FIG. 1 in greater detail.
Figure 3:
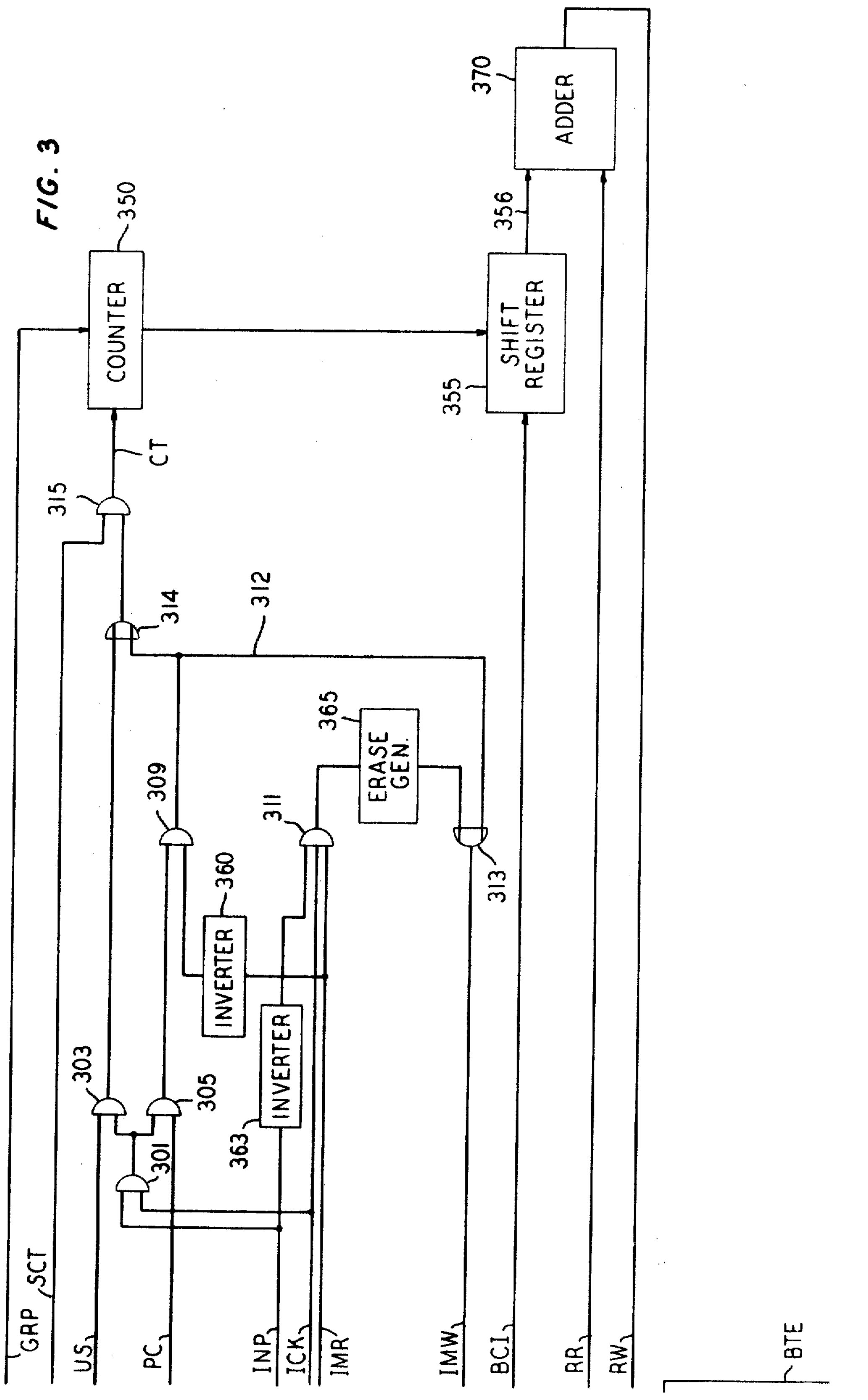
Figure 4:
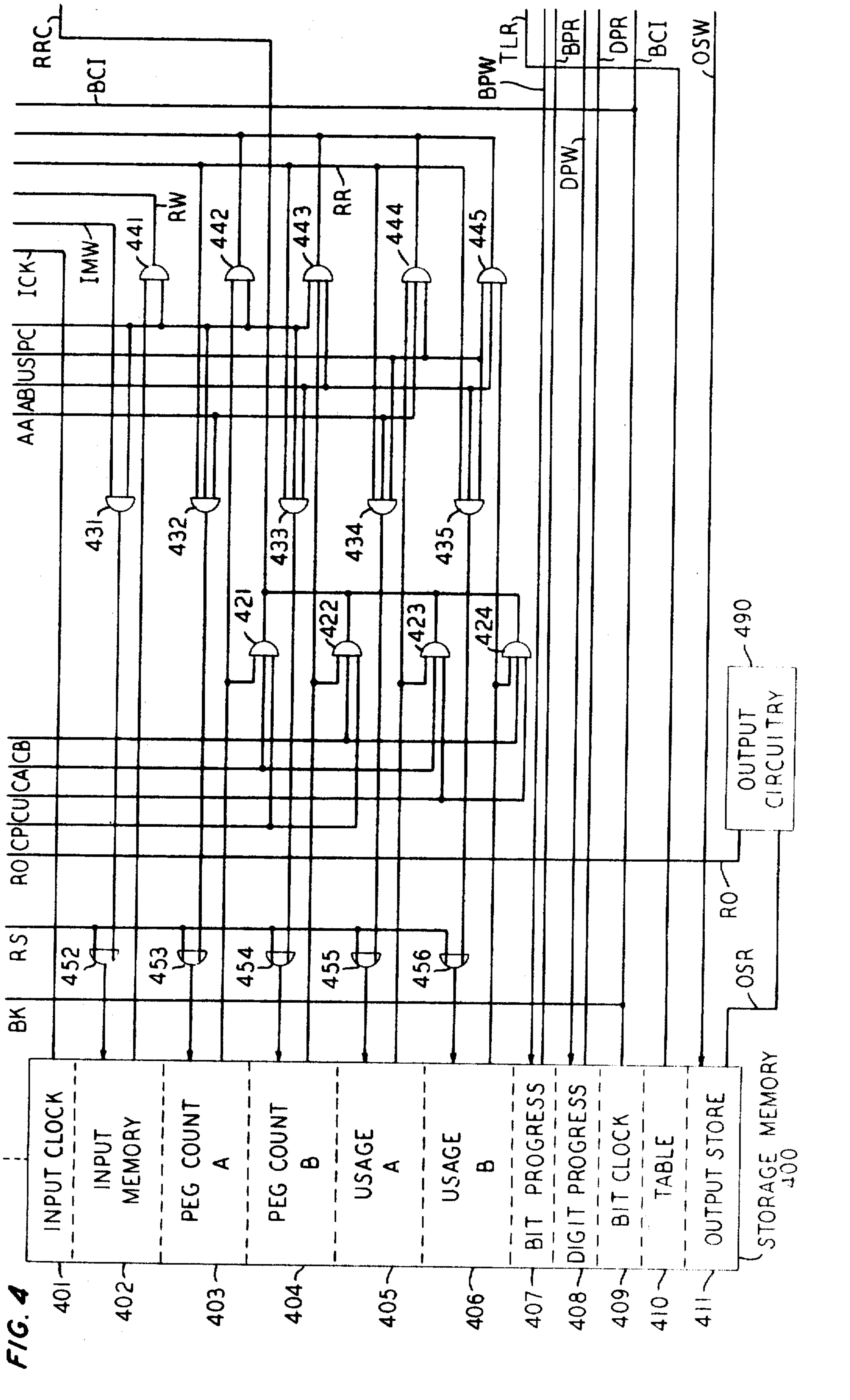
Figure 5:
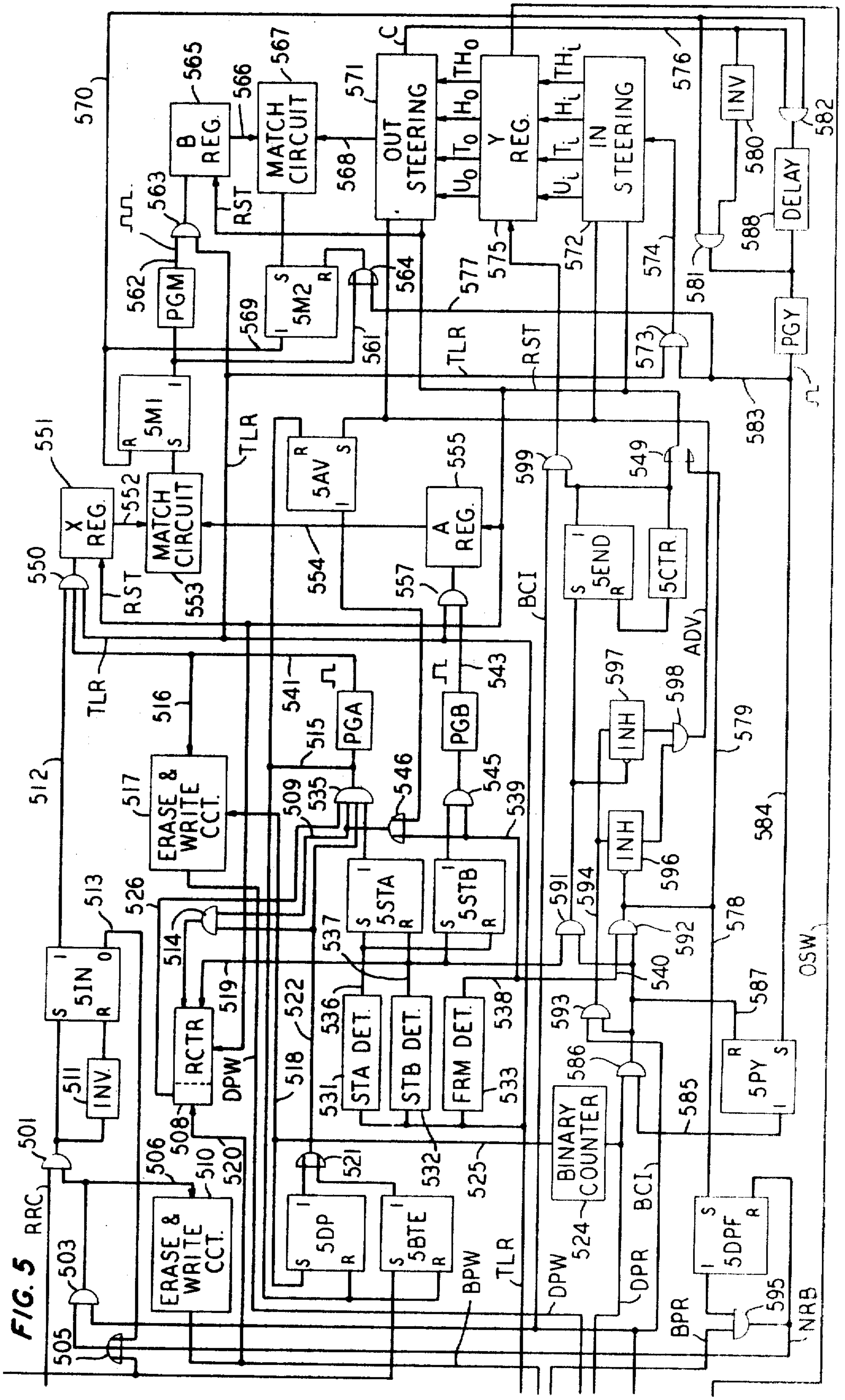

The illustrative embodiments of the drawing and the following description are directed toward equipment monitoring and data recording equipment for collecting statistical traffic data from a plurality of telephone equipment units. It is desired to point out, however, that our invention may also be employed to advantage in a wide range of data monitoring applications, particularly those requiring the "funneling" of data from a plurality of sources to a single electronic registering or recording apparatus. For example, our invention may be utilized to monitor telephone message unit indications for billing purposes or to monitor indications in various telemetering applications for billing or statistical purposes.

Reference is now made to FIG. 1 of the drawing wherein is depicted a block diagram embodiment of traffic data measurement apparatus advantageously employing the principles of our invention. The illustrative embodiment depicted is an arrangement for monitoring both peg count and traffic usage indications from a plurality of equipment units (not shown) connected to individual ones of input terminals T1 through T*n*. For example, each of the equipment units connected to input terminals T1 through T*n* may comprise individual telephone trunk circuits or groups of trunk circuits and the condition to be monitored may be one of seizure for use. The seizure of an equipment unit, it will be assumed, provides a distinctive indication at the input terminal T1 through T*n* connected thereto, such as a particular potential level. The embodiment in FIG. 1 functions to detect the presence of the seizure for use indication at the input terminal and to record a manifestation thereof in data store 60. The recorded manifestations are accumulated for predetermined periods of time and are then encoded and recorded in output store 90 in a form suitable for subsequent processing by automatic traffic data processing equipment, such as disclosed in the abovementioned F. M. Goetz et al. patent, or by other electronic data processing equipment.

Scanner 10 cyclically monitors or scans terminals T1 through T*n* one at a time and extends the individual seizure for use indications appearing thereat serially to path 11. The indications appearing on path 11 in accordance with our invention may be accumulated and recorded as peg count data, as usage data, or as both, under the control of control circuit 55. Peg count circuitry 50 is enabled over path 56 by control circuit 55 for peg count data recording and usage gate 58 is enabled over path 57 for usage data recording. Control circuit 55 may comprise, for example, a clock timer for enabling peg count circuitry 50 for predetermined intervals of time interrupted periodically by enabling usage gate 58 for perhaps one cycle of scanner 10.

Moreover, the peg count and usage data may be accumulated and recorded with respect to individual ones of terminals T1 through T*n* or with respect to groups of the input terminals. A problem often encountered with prior recording apparatus is that they permit input grouping only in fixed group sizes or in multiples of a certain group size. An important aspect of the present invention eliminates this problem by providing substantially unlimited input grouping flexibility via group marker 15 and group mark detector 35.

Group marker 15 provides a distinctive group signal, such as a different potential level from the input indications, to selected ones of input terminals T1 through T*n*, such as terminals T10 and T28, to which group marker 15 is connected. In this manner the group signals are employed to frame the input terminals in whatever grouping sizes are desired for the particular application. Thus, illustratively in FIG. 1 input terminals T1 through T9 form an input group defined or framed by the group signals at terminals T10 and T*n*. The groupings are readily changeable in size by changing the connections of group marker 15 to the input terminals. Moreover, it will be readily appreciated that this manner of grouping permits input groupings to be made at the equipment unit location, such as a telephone central office, and does not require wiring changes in the traffic measurement apparatus when the apparatus is moved from one location to another.

Consider first the accumulation and recording of the seizure for use indications on path 11 as peg count data, with control circuit 55 enabling peg count circuitry 50. Input memory 20 is associated with scanner 10 via peg count circuitry 50 for obtaining the peg count data by comparing the results of the current scan with the results of the previous scan. For example, assume that the previous scan of terminals T1 through T*n* detected no indication appearing at terminal T1, indicating that the particular equipment unit connected thereto was not seized for use at that time. However, assume that the particular equipment unit is seized subsequently and an indication thereof is provided to terminal T1. During the current scan of terminals T1 through T*n* the seizure for use indication at terminal T1 is detected and extended by scanner 10 to path 11 for comparison by comparator 30 with input memory 20.

The absence of an indication recorded in input memory 20 for terminal T1, coupled with the presence of the seizure for use indication on path 11 for terminal T1, shows that the equipment unit connected to terminal T1 has been seized for use since the previous scan. Responsive thereto, peg count circuitry 50 registers the indication in counter 40 and temporarily records the indication as a last look indication for terminal T1 in input memory 20. The scan cycle continues through input terminal T9, each new seizure for use indication at one of terminals T1 through T9 being registered in counter 40 and recorded as a corresponding last look indication in input memory 20. Counter 40 at this point, therefore, contains a count of the number of new seizures for use since the previous scan of the equipment units in the particular group connected to input terminals T1 through T9.

When scanner 10 scans input terminal T10 the group signal thereat is provided over path 11 and is detected by group mark detector 35. Responsive thereto, group mark detector 35, via path 38, effects transfer of the count in counter 40 over path 41 to data store 60 for recordation. Counter 40 is then free to accumulate the peg count for the next input group starting with the equipment unit connected to input terminal T11.

Data store 60 comprises a plurality of storage register locations individually associated with the respective peg count and usage groups. The peg count data for the group connected to input terminals T1 through T9 is thus stored in a storage register location associated therewith in data store 60. The new group peg counts provided on path 41 by counter 40 as a result of the current scan are added, via adder 70, to the existing peg counts for the particular groups stored in the associated storage register locations in data store 60.

During subsequent scans of terminal T1, if the equipment unit connected thereto remains seized for use the indication thereof extended to path 11 compares to the recorded last look indication for terminal T1 in input memory 20. Accordingly, no change appears and no further action is taken. When the equipment unit connected to terminal T1 is released, however, the seizure for use indication at terminal T1 ceases. This condition is detected in a later scan by the absence of an indication on path 11 for terminal T1, comparator 30 noting the existing recorded last look indication in input memory 20 for terminal T1. Peg count circuitry 50 is responsive to this change in state, effecting erasure of the recorded last look indication for terminal T1 in input memory 20.

Peg count data continues to be accumulated and recorded in data store 60 in this manner on a group-by-group, cycle-by-cycle basis until the measurement interval for obtaining such data expires. Periodically, however, under the control of control circuit 55, the accumulation of peg count data may be interrupted advantageously for one scan cycle to accumulate and record usage data pertaining to the equipment units connected to terminals T1 through T*n*. Usage data, it will be recalled, relates to traffic density rather than to traffic counts. The equipment units are scanned at regular intervals and indications are registered of whether the individual units are seized for use at the time of the scan, it being then assumed that a seizure present at the time of the scan persists for the interval between successive scans. Thus there is no requirement for input memory 20 or comparator 30 when accumulating and recording usage data. Rather, each seizure for use indication on path 11 is extended through usage gate 58, enabled by control circuit 55, directly over path 59 to counter 40.

When a group signal is detected by group mark detector 35, the group usage count in counter 40 is transferred over path 41 to a respective usage data storage register location for the group in data store 60 in the same manner as described above for peg count data. The group usage data provided on path 41 is added by adder 70 to the existing usage data in the particular group storage register location in data store 60.

Periodically under the control of control circuit 55, for example, hourly or half-hourly, the peg count and usage data totals accumulated in data store 60 are read out over path 65 and encoded by translator 80 for storage in output store 90. Translator 80 encodes the data in a form, such as binary coded decimal, suitable for subsequent automatic processing thereof and transfers the encoded data to output store 90 at the same time that new data is being accumulated in data store 60. According to one aspect of our invention, as described in detail in connection with the embodiment of FIGS. 2 through 5 below, this is accomplished advantageously using a rotating multitrack magnetic storage medium comprising data store 60, input memory 20 and translator 80, which cycles in synchronism with scanner 10.

DETAILED DESCRIPTION OF THE INVENTION

Figure 6:
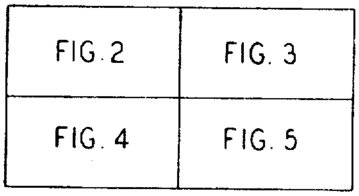

A more complete and comprehensive description of a specific illustrative embodiment in accordance with the principles of our invention will be found hereinbelow in the detaled description of the block diagram depicted in FIGS. 2 through 5, when arranged as shown in FIG. 6. The block diagram in FIGS. 2 through 5 basically comprises three functional components: input scanner 200, storage memory 400 and interconnecting logic and control circuitry.

Input scanner 200 illustratively comprises a disc 201 of nonconducting material having a plurality of radial segments 202 of electrically conducting material disposed thereon and connected at one end to potential source 205. Each of radial segments 202 is connected at the other end through a resistance 206 to a respective one of input terminals TM1 through TM*m*. Individual equipment units

210 which are to be monitored are arbitrarily associated with respective ones of input terminals TM1 through TM*m* and are connected thereto via respective input leads 208.

Each of equipment units 210 includes a normally open relay contact 211 which closes on the particular equipment unit assuming a condition being monitored. For example, as mentioned above, equipment units 210 may comprise individual trunk circuits or groups of trunk circuits and the condition to be monitored may be one of seizure for use. The seizure of an equipment unit 210 is assumed to effect closure of its contact 211 to connect a reference potential, shown in the drawing as ground potential, to the individual input lead 208 emanating from the particular seized equipment unit. Ground potential on one of leads 208, therefore, is an indication of the seizure for use of the particular equipment unit 210 connected thereto. The embodiment in FIGS. 2 through 5 functions to detect the presence of such indications on leads 208 and to record manifestations thereof in the form of peg count or volume data, or in the form of usage or density data, or in both forms.

Input terminals TM1 through TM*m* may be selectively arranged in various groupings by connecting group signal potential source 215 to selected ones of the input terminals, such as input terminals TM650, TM785 and TM920. The current flowing through radial segments 202 connected to input terminals TM650, TM785 and TM920 is thus opposite in polarity from the current flowing in one of segments 202 when a seizure for use indication appears on the corresponding input lead 208. The opposite polarity currents flowing in the radial segments 202 connected to the selected input terminals are detected as group signals and are employed to frame the remaining input terminals in groups. Thus, for example, the input terminals between terminals TM785 and TM920 form an input group. The group sizes are, of course, readily changeable by connecting source 215 to different ones of input terminals TM1 through TM*m*.

Three adjacent radial segments 204, which may be individually identical to radial segments 202, are connected through resistance 207 to source 215 to provide a start or sync reference point for input scanner 200. Segments 204 are each connected at the other end to source 205 and thus have current flowing therethrough in the same direction as the segments 202 connected to source 215 for grouping. Three consecutive group signals, therefore, are detected and employed hereinbelow as a sync signal to indicate the start reference point for scanner 200.

Mounted above the disc and rotating in a plane parallel to segments 202 and 204 is a flying head 220 electrically connected to scanner output lead 225. Head 220 rotates in close proximity to segments 202 and 204 and produces an output signal on lead 225 proportional to, and corresponding in polarity to, the current flowing through each segment as head 220 passes adjacent.

Storage memory 400 illustratively comprises a magnetic disc or drum coupled via drive control 250 to input scanner 200 such that memory 400 and head 220 of scanner 200 rotate in synchronism. For example, scanner 200 and memory 400 may be coupled advantageously to the same drive shaft of a drive motor (not shown) in drive control 250. Storage memory 400 includes a plurality of tracks each having one or more magnetic transducers disposed adjacent thereto, as is well known in the art, for reading and writing signals on the individual tracks. The first two tracks of memory 400, tracks 401 and 402, designated "INPUT CLOCK" and "INPUT MEMORY" are employed in connection with scanner 200 for collecting peg count and usage data. The input memory track 402 corresponds generally to input memory 20 of FIG. 1. Portions of tracks 401 and 402 are depicted in greater detail in FIG. 7B to facilitate the description hereinbelow.

The next four tracks of memory 400, tracks 403 through 406, designated "PEG COUNT A," PEG COUNT B," "USAGE A" and "USAGE B," are employed for accumulating the peg count and usage data and correspond generally to data store 60 of FIG. 1. The "BIT PROGRESS," "DIGIT PROGRESS," and "TABLE" tracks, tracks 407, 408, and 410, respectively, correspond generally to translator 80 in FIG. 1 and are employed for encoding the accumulated data for storage in "OUTPUT STORE" track 411 which corresponds to output store 90 in FIG. 1. Bit timing signals are provided by "BIT CLOCK" track 409. Portions of tracks 403 through 411 of storage memory 400 are depicted in greater detail in FIG. 7A to facilitate description of the operation of the invention.

Consider now the operation of the embodiment of FIGS. 2 through 5 in collecting and accumulating peg count and usage data pertaining to the equipment units 210 connected to terminals TM1 through TM*m*. Program control 260 includes a conventional timer or clock 265 for determining the periods during which data is accumulated and recorded. For example, assume that peg count data is to be accumulated starting at a particular time and extending for a period of two hours and that encoded hourly totals are to be stored in output store track 411 of memory 400. Further, assume that during this two-hour period usage data is to be accumulated once each one hundred seconds, as is usual in the case of telephone traffic data.

When the particular starting time arrives, as indicated by clock 265, program control 260 energizes drive control 250 via path 261 to initiate operation of input scanner 200 and memory 400. The bit timing signals from bit clock track 409 are monitored by program control 260 over lead BK to determine when memory 400 and scanner 200 reach the proper operating frequency. When the proper operating frequency is reached, program control 260 is enabled to recognize the next occurrence of the scanner sync signal on output lead 225 over path 235. Responsive thereto, program control 260 applies an erase signal to lead RS for one erase cycle to effect erasure of tracks 402 through 406. Upon detection of the sync signal on path 235 a second time, upon completion of the erase cycle, program control 260 removes the erase signal from lead RS and prepares for the accumulation of data.

Assuming the first hour of peg count data is to be collected on peg count A track 403, program control 260 energizes peg count lead PC and accumulate lead AA to enable gates 431, 432, 441 and 442 for access to input memory track 402 and track 403 of memory 400. Timing for the collection of input data is via input clock signals obtained from input clock track 401 over lead ICK. An individual input clock signal is priorly recorded on track 401 corresponding to each segment 202 of scanner 200. Thus, as scanner 200 and memory 400 rotate in synchronism, an input clock signal appears on lead ICK each time head 220 is positioned adjacent one of segments 202. The clock signals on lead ICK are employed, therefore, via gates 301 and 311 to strobe input data lead INP which is connected to scanner output lead 225 of scanner 200.

During the first cycle of scanner 200 and memory 400 after the erase cycle, terminals TM1 through TM*m* are scanned to provide seizure for use indications on lead INP coincidentally with the appearance of the input clock signals on lead ICK. The seizure for use indications on lead INP are directed through gate 301, enabled by the corresponding input clock signals on lead ICK, and through gate 305, enabled by the energizing signal on peg count lead PC from program control 260, to one input of gate 309. The other input of gate 309 is connected through inverter 360 to input memory readout lead IMR. Thus, gate 309 is enabled to direct the seizure for use indications therethrough to lead 310 only when no corresponding last look or previous scan indication appears on lead IMR from input memory track 402, signifying that the indication on lead INP is a new seizure for use which is to be counted. In the first scan cycle, of course, no last look indications appear on lead IMR since there are no indications stored on input memory track 402 from any previous scans.

Each seizure for use indication on lead INP during the first cycle, therefore, appears on lead 310 and is directed over lead 312, through OR gate 313, over input memory write lead IMW, through enabled gate 431 and OR gate 452 to effect the storage thereof on input memory track 402. At the end of the first scan cycle, input memory track 402 thus contains a recorded indication of each equipment unit which was seized for use at the start of peg count data accumulation.

Figure 7B:
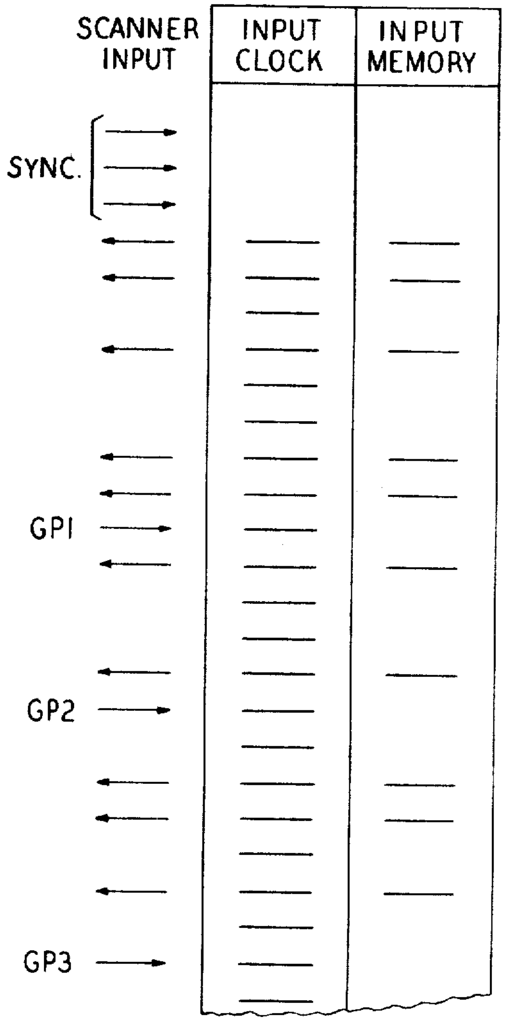
FIGS. 7A and 7B show portions of the data storage memory in greater detail to facilitate describing the operation of the invention.

The column designated "INPUT MEMORY" in FIG. 7B depicts the typical appearance of input memory track 402 at the end of the first cycle of operation, each horizontal mark corresponding to a recorded last look indication. Each horizontal mark pointing to the left in the column under "SCANNER INPUT" in FIG. 7B represents a respective seized equipment unit 210, or the corresponding seizure for use indication appearing on lead INP during the first cycle. Each horizontal mark pointing to the right under "SCANNER INPUT," such as those designated GP1, GP2 and GP3, represents a segment 202 connected to source 215 or a corresponding group signal on path 235. The three successive horizontal marks pointing to the right under "SCANNER INPUT" represent a sync signal generated on path 235 when segments 204 are scanned. Under the column designated "INPUT CLOCK" in FIG. 7B, each horizontal mark represents an input clock signal recorded on input clock track 401 corresponding to a respective one of segments 202 of scanner 200.

The appearance of the sync signal on path 235, at the beginning of the second cycle after the erase cycle, is detected by program control 260 which energizes start count lead SCT to enable count gate 315 for data accumulation. During each successive peg count cycle of operation, input clock track 401 and input memory track 402 are read simultaneously with the provision by scanner 200 of the seizure for use indications over lead INP. In the manner described above, each seizure for use indication on lead INP is directed through gates 301 and 305 to gate 309. If a corresponding last look indication appears on lead IMR from input memory track 402, indicating that the particular equipment unit from which the seizure for use indication obtained was seized during the previous scan, then gate 309 is disabled via inverter 360 and no further action takes place. It should be noted that the scanning frequency of scanner 200 is somewhat faster than the shortest anticipated seizure for use holding time of any of equipment units 210.

If a corresponding last look indication does not appear on lead IMR from input memory track 402, indicating that the particular equipment unit was not seized during the previous scan and that this is a new seizure for use which is to be counted, gate 309 is enabled. The seizure for use indication on lead INP is directed through enabled gate 309 to lead 310, through OR gate 314 and enabled count gate 315, over lead CT to counter 350 for registration. At the same time, the new seizure for use indication on lead 310 is directed over lead 312, through OR gate 313, over lead IMW, through enabled gate 431 and OR gate 452 to effect the storage thereof as a last look indication on input memory track 402.

On the other hand, if a last look indication appears on lead IMR but no seizure for use indication appears on lead INP, this indicates that the particular equipment unit being scanned was previously in use but is now released. Responsive thereto, gate 311 is enabled to energize erase generator 365, providing an erase signal through OR gate 313, over lead IMW to erase the corresponding last look indication for the particular equipment unit 210 from input memory track 402. This erase operation, as well as the write operation mentioned above, is accomplished on the same pass as the read operation.

Scanning of equipment units 210 and registration of the seizure for use counts in counter 350 continues in this manner on a group-by-group, cycle-by-cycle basis. Each time a group signal is detected from scanner 200 on path 235, such as group signal GP1 in FIG. 7B, program control 260 provides a dump signal over group lead GRP to transfer the group peg count in counter 350 to shift register 355, clearing counter 350 for accumulation of the peg count for the next equipment unit group.

The group peg count in shift register 355 is then read out, one bit at a time, by the bit clock signals on lead BCI, over path 356 to one input of adder 370. Concurrently, the previously accumulated peg count total for the particular group, if any, is read from the particular group storage location on track 403, one bit at a time, through enabled gate 442 over register readout lead RR to a second input of adder 370. Adder 370 accordingly combines the two inputs and generates the updated total peg count for the group over register write lead RW through enabled gate 432 and OR gate 453 for registration as a multibit word on peg count A track 403. The updated peg count total registered on track 403 for the particular equipment unit group just scanned thus reflects the addition of the new peg count accumulated during the current scan.

Figure 7A:
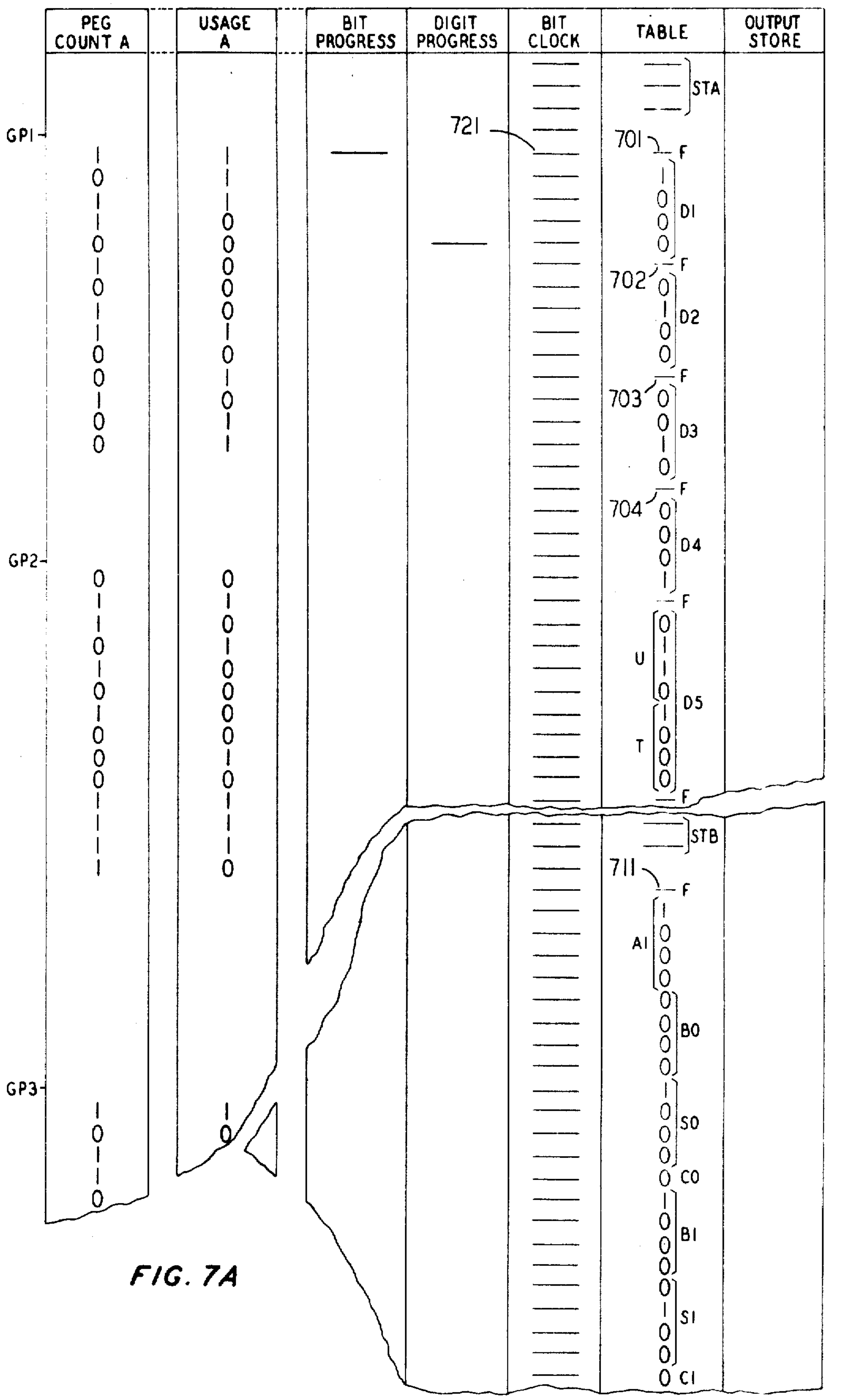

As depicted in FIG. 7A, the storage location on track 403 for each group peg count begins coincident with, or shortly after, the beginning of the next successive group of input indications. Thus, while the first group peg count total is being updated on peg count A track 403, the second group of input terminals is being scanned to register new seizure for use indications therefrom in counter 350 in the manner described above. As mentioned, timing signals for the reading and writing of the peg count totals in the storage locations on track 403 are derived from bit clock track 409 while the timing signals for collecting and registering the new seizure for use indications in counter 350 and for reading and writing the last look indications on track 402 are derived from input clock track 401. There need be no particular relationship between the frequency of the bit clock signals on track 409 and the frequency of the input clock signals on track 401 except that, advantageously, the bit clock frequency is substantially faster than the input clock frequency. For example, the input clock signals may appear on lead ICK at the rate of 450 kh. and the bit clock signals may appear on lead BCI at the rate of 4.5 mh.

Now assume that clock 265 indicates that it is time to interrupt the peg count data collection to collect usage data for one cycle of scanner 200. Upon completion of the current peg count scan by scanner 200 the sync signal therefrom on path 235 is detected by program control 260 to initiate a usage data scan cycle. Program control 260 deenergizes peg count lead PC and energizes usage lead US, accumulate lead AA and lead SCT remaining energized. Gates 431, 432, 441 and 442 are thus disabled, and gates 434 and 444 are enabled to permit access, via register read and write leads RR and RW, to usage A track 405 of memory 400. It is noted that no use is made of input memory track 402 during a usage data scan since usage data is not concerned with any past condition of an equipment unit but only with its condition at the time of the scan.

Gate 303 is enabled via usage lead US to direct each seizure for use indication appearing on lead INP during the usage scan cycle to counter 350 through OR gate 314 and enabled count gate 315 over lead CT. Thus, counter 350 is advanced one count for each seizure for use indication appearing on lead CT during a usage scan cycle in the same manner as during a peg count scan cycle. When a group signal from scanner 200 appears on path 235 and is detected by program control 260, a dump signal is provided on group lead GRP to transfer the group usage count from counter 350 to shift register 355. Counter 350 is then free to accumulate the usage count for the next group of equipment units.

The count in register 355 is read out one bit at a time by the bit clock signals on lead BCI to adder 370 concurrently with the previous usage count total for the group read out from usage A track 405 through enabled gate 444 over lead RR. The updated total usage count for the group is provided one bit at a time by adder 370 over register write lead RW through enabled gate 434 and OR gate 455 for registration in the corresponding group storage location on track 405.

After the completion of the usage data scan, one cycle of scanner 200 and memory 400, detection of the scanner sync signal on path 235 by program control 260 returns the measurement apparatus to peg count data collection. Specifically, program control 260 disables usage lead US and reenergizes peg count lead PC. Thus, the above-described peg count data collection continues, interrupted periodically under the control of clock 265 for the collection of usage data, until the end of a measurement interval. The measurement interval may be, for example, one hour as assumed herein for the purposes of description.

At the end of the measurement interval, the accumulated peg count and usage data totals are encoded and transferred to output store track 411 for subsequent output to output circitry 490. Storage memory 400 is provided with a pair of tracks 403 and 404 for peg count data accumulation and a pair of tracks 405 and 406 for usage data accumulation. As the data accumulated on tracks 403 and 405 is being encoded and transferred to output store track 411, the accumulation of additional data pertaining to equipment units 210 advantageously continues concurrently on tracks 404 and 406. Accumulation of subsequent peg count data on track 404 and usage data on track 406 is initiated by program control 260 disabling accumulate lead AA and energizing accumulate lead AB. The accumulation of peg count and usage data on tracks 404 and 406 during the next measurement interval is effected in substantially the same manner as described above for tracks 403 and 405.

The peg count and usage data totals accumulated on peg count A track 403 and usage A track 405 are in binary form, as depicted in FIG. 7A. It is usually desirable to translate these totals into a form, such as binary coded decimal, which is more suitable for subsequent processing or outputting before storing the totals on output store track 411. For this purpose a translation table is recorded on table track 410 of memory 400, a portion of which is depicted in FIG. 7A. As each bit of a total is read from track 403 or from track 405, the corresponding binary coded decimal value is "looked up" in a first part of the table on track 410. The successive bit values are combined via a second part of the table on track 410 until the translation for a particular total is completed and stored on output store track 411. The translation of each such total from tracks 403 and 405 is thus broken into a plurality of steps taking perhaps twenty to thirty cycles or more of memory 400.

Consider now the operation of the embodiment of FIGS. 2 through 5 in encoding the accumulated data totals on tracks 403 and 405 and transferring the encoded data totals to output store track 411. When the end of the measurement interval is indicated by clock 265, program control 260 detects the next scanner sync signal on path 235, disables accumulate lead AA and energizes accumulate lead AB, and energizes code leads CA and CP. With code leads CA and CP energized, gate 421 is enabled to direct the peg count totals read from track 403 over register read and code lead RRC to code input gate 501. When the first group signal is detected on path 235, depicted as GP1 in FIG. 7A, program control 260 initiates data transfer and encoding via a start signal on lead BTE. The start signal on lead BTE sets begin transfer and encode flip-flop 5BTE, the set output thereof through OR gate 521 over lead 522 being applied to one input of gate 535. The start signal on lead BTE is also directed through OR gate 505 to one input of gate 503 and persists long enough to direct the next bit clock signal on lead BCI, bit clock signal 721 in FIG. 7A, through gate 503 to gate 501.

The bit clock signal thus applied to gate 501 coincides with the first bit of the first group peg count total readout from track 403 on lead RRC. The first bit read out on lead RRC is consequently directed through gate 501 to input flip-flop 5IN, setting or resetting flip-flop 5IN in accordance with the binary character of the bit. Assuming the first bit to be a binary "1," as depicted illustratively on the "PEG COUNT A" track in FIG. 7A, flip-flop 5IN is set, the set output thereof being directed over lead 512 to one input of gate 550. At the same time, the bit clock signal through gate 503 is directed over lead 506 to erase and write circuit 510, which is responsive thereto for providing a signal over bit progress write lead BPW to write a bit progress mark on track 407, as depicted by the horizontal mark under "BIT PROGRESS" in FIG. 7A.

The contents of table track 410 of memory 400 are read out concurrently over table read lead TLR. The table on track 410, it will be recalled, comprises two parts which are delineated by respective start signals depicted by start signals STA and STB in FIG. 7A. Start signals STA and STB appearing on lead TLR are detected by respective detector circuits 531 and 532. The table on track 410 is further subdivided into portions within the two parts separated by frame signals, depicted in FIG. 7A by the horizontal lines designated "F." Frame signals F appearing on lead TLR are detected by frame detector 533.

The first part of the table on track 410 beginning with start signal STA comprises the respective binary coded decimal value for a binary "1" appearing in each of the bit positions of a count total which is to be encoded. As depicted in FIG. 7A, by way of example, each count total is assumed to be a fourteen bit word; and thus the first part of the table on track 410 includes fourteen different binary coded decimal values for the respective bit positions. Five of these binary coded decimal values, designed numbers D1 through D5, are shown in FIG. 7A. For example, if a binary "1" appears in the third bit position of a count total, reference to number D3 of the table indicates that the binary coded decimal value for the bit is "0100." If a binary "1" appears in the fifth digit position of the count total, number D5 of the table indicates that two binary coded decimal digits are required, a units digit "U" and a tens digit "T," the encoded value for the bit being "0001 0110." A binary "1" appearing in the fourteenth bit position of a count total, by way of further example, requires four binary coded decimal digits (not shown in FIG. 7A) since the encoded value therefor is "1000 0001 1001 0010."

The second part of the table on track 410, beginning with start signal STB, comprises a sum "S" and a carry "C" for various combinations of binary coded decimal digits. Using this part of the table on track 410 the binary coded decimal value of each successive bit of a count total is combined, digit by digit, with the cumulative value of all preceding bits of the count total until the count total for a group has been completely encoded. Herein the value of a binary coded decimal digit for the bit being encoded is referred to and depicted in FIG. 7A as the number "A;" and the binary coded decimal digit of the cumulative value for the preceding bits of the particular count total is referred to and depicted in FIG. 7A as the number "B." When the appropriate A and B numbers are located in the table the immediately following sum S and carry C for the particular combination are obtained. For example, assume that the value of a binary coded decimal digit for a bit, as obtained from the first part of the table on track 410, is "0001" and, further, that the value of the corresponding binary coded decimal digit for the preceding bits is "0001." These values are located in the second part of the table as number A1 and number B1, and the sum S1 ("0010") and the carry C1 ("0") for the combination thereof are obtained from the table.

Returning now to the encoding operation, at the same time that PEG COUNT A track 403 is being read out on lead RRC and the first bit therefrom registered in input flip-flop 5IN, table track 410 is read out on lead TLR. Start signal STA for the first part of the table is detected by detector 531, the output of which on lead 536 sets flip-flop 5STA and resets flip-flop 5STB. The set output of flip-flop 5STA is directed to a second input of gate 535. Shortly thereafter the first frame signal F from track 410 on lead TLR, designated 701 in FIG. 7A, is detected by frame detector 533. Responsive thereto, detector 533 provides an output signal on lead 538, over lead 539, through OR gate 546 to a third input of gate 535. Initially it is assumed that a "1" bit is registered in the first stage 508 of reversible counter RCTR, the output therefrom on lead 526 enabling the fourth input of gate 535. All of the inputs of gate 535 are thus enabled at this point, providing a signal therethrough to energize pulse generator PGA. The signal through gate 535 is also extended over lead 515 to reset flip-flops 5DP, 5BTE and 5AV, the resetting of flip-flop 5BTE disabling gate 535.

Pulse generator PGA, when energized, provides a gating pulse on lead 541 to a second input of gate 550 of sufficient duration to direct the next four bits appearing on lead TLR from track 410 therethrough to X registered 551. These four bits, designated D1 in FIG. 7A, represent the binary coded decimal value of a binary "1" in the first bit position of the count total being encoded from track 403. Thus, at this point, register 551 has stored therein the four-bit word "0001," which is reflected in parallel over bus 552 to match circuit 553.

The trailing edge of the gating pulse from pulse generator PGA on lead 541 is detected, via lead 516, by erase-and-write circuit 517 which is responsive thereto for providing a signal on digit progress write lead DPW to write a digit progress mark on track 408. The digit progress mark recorded on track 408 is depicted by the horizontal mark under "DIGIT PROGRESS" in FIG. 7A and, as indicated, is approximately in line with the last bit of the binary coded decimal digit read from table track 410 and registered in X register 551.

When start signal STB is subsequently read from track 410 on lead TLR at the beginning of the second part of the table, detector 532 is responsive thereto to provide a signal on lead 537 which resets flip-flop 5STA and sets flip-flop 5STB. The set output of flip-flop 5STB enables gate 545. The next frame signal F from track 410, designated 711 in FIG. 7A, is detected by frame detector 533 and the consequent output signal therefrom on lead 538, over lead 539, is directed through enabled gate 545 to energize pulse generator PGB. The output from detector 532 on lead 537 is also extended over shift left lead 519 to reversible counter RCTR, but is of no consequence at this point since the bit therein already resides in the leftmost stage 508 of counter RCTR.

Pulse generator PGB, when energized, provides a gating pulse on lead 543 of sufficient duration to enable gate 557 to direct the next four bits appearing on lead TLR from track 410 therethrough to A register 555. These four bits, designated A1 in FIG. 7A, are registered in A register 555 and are reflected in parallel over bus 554 to match circuit 553.

If a match obtains, as it does in this instance, match circuit 553 sets match flip-flop 5M1, the output of which energizes pulse generator PGM and, via lead 561 through OR gate 564, resets match flip-flop 5M2. Energized pulse generator PGM provides a stream of gating pulses on lead 562 to gate 563, each gating pulse being of sufficient duration to gate four successive bits read out on lead TLR through gate 563 to B register 565. The gating pulses on lead 562 are separated by an interval equal to five bits.

Thus, when pulse generator PGM is initially energized, the first gating pulse therefrom on lead 562 directs the next four bits read out on lead TLR from track 410 through gate 563 to B register 565. In the example being described, these four bits correspond to the number B0 in FIG. 7A and are reflected by register 565 over bus 566 to match circuit 567. If no match obtains with the four-bit binary coded decimal digit extended from Y register 575 over bus 568 in the manner described below, the next five bits read from track 410 on lead TLR, corresponding to sum SO and carry CO in FIG. 7A, are skipped; and the next gating pulse on lead 562 directs the successive four-bit B number through gate 563 to B register 565, in this case the number B1 in FIG. 7A. This process continues until a match obtains between the B number read from track 410 and registered in register 565 and the four-bit binary coded decimal digit directed from Y register 575 over bus 568.

Register 575 has sufficient storage capacity to register the binary coded decimal value of a single count total. In the illustrative example herein, therefore, register 575 has storage capacity for four binary coded decimal digits, or sixteen bits, and for individual carry bits for each digit. The digit storage positions of register 575 are individually accessed via respective digit input buses $U_i$, $T_i$, $H_i$ and $TH_i$ for write-in operations through in-steering circuit 572, and via respective digit output buses $U_o$, $T_o$, $H_o$ and $TH_o$ for readout operations to bus 568 through out-steering circuit 571. During encoding of each count total, register 575 stores the four digit cumulative binary coded decimal value until the particular count total has been completely encoded. At the beginning of the encoding operation, Y registers 575 contains all binary zeros and steering circuits 571 and 572 connect bus 568 and lead 574 to the respective digit input and output buses $U_o$ and $U_i$ for register 575. Therefore, initially the units digit in register 575 is reflected over bus 568 to match circuit 567 and the carry bit for the units digit is extended through steering circuit 571 to carry lead 576.

Since register 575 initially contains all binary zeros, a match obtains when the number B0 is registered in B register 565 in the manner described above. Responsive thereto, match circuit 567 sets match flip-flop 5M2, the output of which via lead 569 resets match flip-flop 5M1 to deenergize pulse generator PGM and terminate the gating pulses on lead 562. The set output of match flip-flop 5M2 is also extended over lead 570 to gates 581 and 582. Gate 581 is enabled by the zero carry bit on lead 576 through inverter 580 to direct the match output signal on lead 570 through to pulse generator PGY. Pulse generator PGY provides a gating pulse on lead 583 of sufficient duration to gate the next five bits from track 410 on lead TLR through gate 573, over lead 574, through steering circuit 572, over digit input bus $U_i$ to the units digit storage position of Y register 575. These five digits correspond to the sum SO and carry CO in FIG. 7A.

The gating pulse from pulse generator PGY is also directed over lead 577 through OR gate 564 to reset match flip-flop 5M2 and over lead 584 to set flip-flop 5PY, thereby enabling gate 586 via lead 585. When the cycle of memory 400 has been completed the digit progress mark on track 408 is read out on lead DPR and extended through enabled gate 586 to gates 591, 592 and 593 and over lead 587 to reset flip-flop 5PY. The digit progress mark on lead DPR is also applied to binary counter 524 which provides an output signal on lead 525 for every second digit progress mark appearing on lead DPR.

Immediately following readout of the digit progress mark on lead DPR a frame signal F, designated 702 in FIG. 7A, appears on lead TLR from track 410. The frame signal is detected by detector 533, the output of which on lead 538 is extended over lead 540 through enabled gate 592 over lead 578 to set flip-flop 5DPF. The signal through gate 592 is also extended over lead 579 through OR gate 549 to reset lead RST, resetting registers 551, 555 and 565 and counter RCTR. The set output of flip-flop 5DPF enables gate 595.

At the same time, a bit clock signal on lead BCI is extended through enabled gate 593 and over lead 594 to inhibit gates 596 and 597. Gate 597 passes the bit clock signal through to one input of advance gate 598. However, the other input of gate 598 remains disabled since the frame detector output signal through gate 592 is applied to the inhibit terminal of inhibit gate 596, blocking passage of the bit clock signal on lead 594. Thus, no steering advance signal is generated on lead ADV at this point.

At the beinning of the next cycle of memory 400 start signal STA on lead TLR is detected by detector circuit 531 to set flip-flop 5STA and reset flip-flop 5STB. The bit progress mark on lead BPR is directed through enabled gate 595, resetting flip-flop 5DPF, and is extended over lead NRB through OR gate 505 to gate 503. Gate 503 is thus enabled to extend the next bit clock signal on lead BCI through to gate 501, thereby gating the second bit of the first count total from track 403 on lead RRC therethrough to input flip-flop 5IN. At the same time, the bit clock signal through gate 503 is directed over lead 506 to erase-and-write circuit 510 which effects, via lead BPW, erasure of the previous bit progress mark from track 407 and writes a new bit progress mark adjacent the second bit of the first count total on track 403. Further, the output of erase-and-write circuit 510 over lead 520 registers a bit in stage 508 of counter RCTR, enabling lead 526 to gate 535.

Since the second count total bit is illustratively a binary "0," flip-flop 5IN is reset through inverter 511, the reset output of flip-flop 5IN being directed over lead 513 through OR gate 505 to enabled gate 503. The next bit clock signal on lead BCI is thus extended through enabled gate 503 to gate 501 thereby gating the third bit of the count total from track 403 on lead RRC through to input flip-flop 5IN. Again, the bit clock signal through gate 503, via erase-and-write circuit 510 over lead BPW, effects erasure of the previous bit progress mark and writes a new bit progress mark in track 407 adjacent the third bit of the first count total on track 403. The output of erase-and-write circuit 510 over lead 520 shifts the bit in reversible counter RCTR one stage to the right of stage 508, disabling lead 526 to gate 535.

Flip-flop 5IN is set by the third bit, illustratively a binary "1" in FIG. 7A, the output thereof on lead 512 enabling one input of gate 550. When the digit progress mark on track 408 appears on lead DPR during the present memory cycle, binary counter 524 provides an output signal on lead 525 setting flip-flop 5DP. The signal on lead 525 is also extended over erase lead 518 to erase-and-write circuit 517 which is responsive thereto to effect erasure of the digit progress mark on track 408 via lead DPW. The set output of flip-flop 5DP through OR gate 521 over lead 522 enables gate 514 and enables one input of gate 535. A second input of gate 535 is enabled by the output of flip-flop 5STA, set upon earlier detection of start signal STA at the beginning of the present cycle. The input of gate 535 connected over lead 526 to counter RCTR, it will be recalled, is not enabled at this point because the bit in counter RCTR resides in the first stage to the right of stage 508.

Accordingly, when the subsequent frame signal F, designated 702 in FIG. 7A, is detected by detector 533, the output therefrom on lead 539 through OR gate 546 is not extended through gate 535. The output from detector circuit 533 on lead 539 through OR gate 546 is, however, extended over lead 509 through enabled gate 514 to counter RCTR, shifting the bit therein one stage to the left, that is to stage 508, to again enable lead 526. Thus, when the next frame signal, designated 703 in FIG. 7A, is detected on lead TLR by detector 533, gate 535 is fully enabled to extend the detector output signal on lead 539 therethrough to energize pulse generator PGA. The signal through gate 535 also resets flip-flop 5DP via lead 515 to disable gate 535.

As described in detail above, the output of pulse generator PGA enables gate 550 to extend the next four bits on lead TLR, number D3 in FIG. 7A, through to X register 551. The trailing edge of the gating pulse from generator PGA over lead 516 energizes erase-and-write circuit 517 to effect, via lead DPW, the recording of a new digit progress mark on track 408 adjacent the last bit of number D3 on track 410. Operation then proceeds in the manner described above, successive A numbers from the second part of the table on track 410 being registered in A register 555 until a match obtains with the digit in X register 551, then registering successive B numbers in B register 565 until a match obtains with the units digit value in Y register 575.

When the last match obtains, as indicated by the setting of match flip-flop 5M2, pulse generator PGY is energized by one of gates 581 and 582 to reset match flip-flop 5M2 over lead 577 and to gate the appropriate sum and carry from table 410 through gate 573 to Y register 575. If the carry bit on carry lead 576 is "0" for the particular prior units digit in register 575, as in the present instance, gate 581 is enabled through inverter 580. The match output through gate 581, therefore, energizes pulse generator PGY to gate the immediately succeeding sum S and carry C from table 410 to register 575. If, on the other hand, the carry bit on lead 576 is "1," gate 582 is enabled and the match output therethrough is delayed by delay 588 for a period corresponding to nine bits on track 410 before energizing pulse generator PGY. Thus, the sum and carry immediately succeeding the matched B number on track 410 are skipped and the sum and carry following the next successive B number are gated to Y register 575.

In either event, flip-flop 5PY is set by pulse generator PGY over lead 584, and the set output of flip-flop 5PY on lead 585 enables gate 586 to direct the digit progress mark therethrough when it is next read out from track 408 on lead DPR. Flip-flop 5PY is reset thereby over lead 587 and gates 591, 592 and 593 are enabled. The next signal appearing on lead TLR during the interval in which gates 591, 592 and 593 are enabled is frame signal 704, which is detected by detector 533 and extended over lead 540 through gate 592 over lead 578 to set flip-flop 5DPF. The signal through gate 592 is also applied to the inhibit terminal of inhibit gate 596. Thus the bit clock signal on lead BCI extended through enabled gate 593 to lead 594 is blocked from advance gate 598 by inhibit gate 596. No steering advance signal is consequently generated on advance lead ADV. The set output of flip-flop 5DPF, coupled via gate 595 and lead NRB with the next appearance of the bit progress mark on lead BPR, effects registration of the next count total bit from track 403 in input flip-flop 5IN and the encoding process continues in the manner just described.

It will be appreciated that the binary coded decimal value for a count total bit of binary "1" character in any bit position higher than the fourth bit position comprises two or more binary coded decimal digits, such as shown for the fifth bit position by number D5 in FIG. 7A. Thus, when the units digit for a multiple digit value has been handled in the manner described above, the next signal appearing on lead TLR from track 410 is not a frame signal but, rather, is the first bit of another binary coded decimal digit, in this case the tens digit. Consequently, the bit clock signal through enabled gate 593 on lead 594 is directed through both of inhibit gates 596 and 597, and then through advance gate 598 as a steering advance signal on lead ADV. The steering advance signal on lead ADV via steering circuit 572 switches the connection of lead 574 from units digit input bus $U_I$ to the tens digit input bus $T_I$ of Y register 575. At the same time, via steering circuit 571, the connection of bus 568 is switched from units digit output bus $U_O$ to tens digit output bus $T_O$ of register 575.

The signal lead ADV also sets flip-flop 5AV, the output of which through OR gate 546 enables one input of gate 535. When the digit progress mark on track 408 next appears on lead DPR, therefore, binary counter 524 provides an output signal on lead 525, setting flip-flop 5DP and causing erase-and-write circuit 517 to erase the digit progress mark from track 408 in the usual manner. Gate 535 is thus fully enabled, energizing pulse generator PGA and, via lead 515, resetting flip-flops 5DP and 5AV. The output of pulse generator PGA gates the tens binary coded decimal digit of the particular number from track 410 into X register 551. Erase-and-write circuit 517 writes a new digit progress mark on track 408 adjacent the last bit of the digit on track 410 which is currently registered in X register 551, and operation continues in the same manner as above for the units digit. The hundreds and thousands digits of multidigit binary coded decimal values from track 410 are handled in like manner.

When the entire fourteen bits of the first count total from track 403 have been handled, one by one, in the above manner, the four-digit binary coded decimal value for the particular count total appears in Y register 575. The digit progress mark on track 408 at this point is adjacent the last bit of the last digit of number D14 (not shown) in the first part of the table on track 410. When encoding is completed this digit progress mark is read out through gate 586 in the usual manner to enable gates 591, 592 and 593. During the interval in which these gates are enabled start signal STB appears on lead TLR and is detected by detector 532 to provide a signal through gate 591 to the set terminal of flip-flop 5END and to the inhibit terminal of inhibit gate 597. Inhibit gate 597 thus blocks the bit clock signal through gate 593 from providing a steering advance signal through gate 598 on lead ADV. Flip-flop 5END is set, enabling gate 599 and resetting steering circuits 571 and 572 and registers 551, 555, 565 and 575 via OR gate 549 and reset lead RST. Successive bit clock signals on lead BCI are directed through enabled gate 599 to effect readout of the four digit number in Y registers 575 serially over output store write lead OSW for recording the encoded total on output store track 411.

Counter 5CTR keeps track of the readout of register 575 via the bit clock signals through gate 599, and, when the encoded count total has been transferred from register 575 to output store track 411, counter 5CTR resets flip-flop 5END to disable gate 599. At this point, then, X register 551, A register 555, B register 565 and Y register 575 are each in a reset or cleared state and encoding of the second peg count total from track 403 begins on a subsequent cycle of memory 400.

Successive peg count totals on track 403 are encoded and transferred to output store track 411 in this manner until all of the totals on track 403 have been transferred to track 411. Program control 260 then disables code lead CP and energizes code lead CU, thereby disabling gate 421 and enabling gate 423 to switch the connection of register read and code lead RRC from peg count A track 403 to usage A track 405. Upon detection of the scanner sync signal and the subsequent first group signal, program control 260 initiates encoding and transfer of the usage totals on track 405 via a start signal on lead BTE. Encoding and transfer of the usage totals from track 405 to output store track 411 proceeds from this point in the same manner as described above for the peg count totals from track 403.

At the end of the second measurement interval the accumulated peg count and usage totals on tracks 404 and 406 are similarly encoded and transferred to output store track 411. Access to tracks 404 and 406 for this purpose is via gates 422 and 424, respectively, enabled by code lead CB from program control 260. As the data on tracks 404 and 406 is being encoded and transferred to track 411, the accumulation of additional data pertaining to equipment units 210 may continue concurrently on tracks 403 and 405, if desired.

The encoded data on output store track 411 is read out over lead OSR by output circuitry 490. Output circuitry 490 may include printout apparatus, data processing circuitry, data transmission circuitry, or the like. Output circuitry 490 may be controlled by program control 260 over path RO or may be controlled by other means (not shown), program control 260 providing an indication over path RO when data accumulation and encoding has been completed for one or more measurement intervals.

It is to be understood that the particular arrangements described above are but illustrative of the application of the principles of the invention. Numerous other arrangements may be devised by those skilled in the art without departing from the spirit and scope of the invention.

What is claimed is:

1. Apparatus for recording traffic data pertaining to a plurality of equipment units comprising; scanning means, memory means operating synchronously with said scanning means, first means operating said scanning means to periodically store and accumulate in a first location in said memory means first manifestations corresponding to predetermined discrete operations of at least a first portion of said plurality of equipment units, second means for inhibiting the operation of said first means periodically and for operating said scanning means to store and accumulate in a second location in said memory means second manifestations corresponding to predetermined conditions on at least a second portion of said plurality of equipment units, and means operative concurrently with said first and second means for encoding previously accumulated first and second manifestations and for storing said encoded manifestations in an output store.

2. Apparatus for recording traffic data pertaining to a plurality of equipment units comprising; scanning means, memory means operating synchronously with said scanning means, first means operating said scanning means to periodically store and accumlate in a first location in said memory means first manifestations corresponding to predetermined discrete operations of at least a first portion of said plurality of equipment units, said first means comprising an input memory, condition detecting means connected to said scanning means for detecting the occurrence of predetermined conditions on said first portion of equipment units, and means connected to said condition detecting means for temporarily storing in said input memory manifestations of said predetermined conditions on said first portion equipment units; and second means for inhibiting the operation of said first means periodically and for operating said scanning means to store and accumulate in a second location in said memory means second manifestations corresponding to said predetermined conditions on at least a second portion of said plurality of equipment units.

3. Apparatus in accordance with claim 2 wherein said first means further comprises operation detecting means connected to said scanning means and to said input memory means for detecting said predetermined discrete operations by comparing the condition of individual ones of said first portion of equipment units during the current operation of said scanning means with the condition of said individual first portion equipment units during the immediately preceding operation of said scanning means.

4. Apparatus in accordance with claim 3 wherein said second means includes means for operating said condition detecting means when said first means is inhibited to detect the occurrence of said predetermined conditions on said second portion of equipment units.

5. Apparatus in accordance with claim 2 further comprising means operative concurrently with said first and second means for encoding previously accumulated first and second manifestations and for storing said encoded manifestations in an output memory store, and wherein said memory means comprises said input memory and said output memory store.

6. Apparatus in accordance with claim 5 further comprising means operative concurrently with said first and second means for reading out said encoded manifestations from said output memory store.

7. Apparatus in accordance with claim 1 wherein said encoding means includes code translation tables stored in a third location in said memory means, and means for comparing said first and second manifestations with discrete portions of said tables.

8. Apparatus for recording traffic data pertaining to a plurality of equipment units comprising; scanning means, memory means operating synchronously with said scanning means, first means operating said scanning means to periodically store and accumulate in a first location in said memory means first manifestations corresponding to predetermined discrete operations of at least a first portion of said plurality of equipment units, second means for inhibiting the operation of said first means periodically and for operating said scanning means to store and accumulate in a second location in said memory means second manifestations corresponding to predetermined conditions on at least a second portion of said plurality of equipment units, and input grouping means connected to said first and second means for selectively arranging said plurality of equipment units in groups and for accumulating said first and second manifestations in totals individually associated with said groups of equipment units.

9. Apparatus in accordance with claim 8 wherein said input grouping means comprises group marking means, means for connecting said group marking means to said scanning means selectively during the operation of said scanning means, intermediate storage means connected to said scanning means for accumulating said first and second manifestations, and means operative when said group marking means is connected to said scanning means for transferring said accumulated manifestations from said intermediate storage means to said memory means.

10. Apparatus in accordance with claim 9 wherein said scanning means comprises a plurality of scan points and means connecting each of said plurality of equipment units to a respective one of said scan points, and wherein said input grouping means comprises means for connecting said group marking means to selected ones of said scan points.

References Cited

UNITED STATES PATENTS

| | | | |
|---|---|---|---|
| 2,528,101 | 10/1950 | Williams ---------- | 235—61 |
| 2,700,148 | 1/1955 | McGuigan et al. ----- | 340—174 |
| 3,229,259 | 1/1966 | Barker et al. ------ | 340—172.5 |
| 3,231,866 | 1/1966 | Goetz et al. ------- | 340—172.5 |

RAULFE B. ZACHE, Primary Examiner